United States Patent [19]

Fitzgibbon

[11] Patent Number: 4,879,181

[45] Date of Patent: Nov. 7, 1989

[54] SINTERED SPHERICAL PELLETS CONTAINING CLAY AS A MAJOR COMPONENT USEFUL FOR GAS AND OIL WELL PROPPANTS

[75] Inventor: Jeremiah J. Fitzgibbon, Lafayette, La.

[73] Assignee: Carbo Ceramics Inc., Irving, Tex.

[21] Appl. No.: 40,534

[22] Filed: Apr. 20, 1987

Related U.S. Application Data

[60] Continuation of Ser. No. 712,909, Mar. 15, 1985, abandoned, and a continuation-in-part of Ser. No. 347,210, Feb. 9, 1982, abandoned, which is a continuation of Ser. No. 565,429, Dec. 27, 1983, abandoned, which is a division of Ser. No. 405,055, Aug. 4, 1982, Pat. No. 4,427,068, which is a continuation-in-part of Ser. No. 347,210, Feb. 9, 1982, abandoned.

[51] Int. Cl.$^4$ .................. B32B 18/00; C09K 7/00
[52] U.S. Cl. .................. 428/402; 252/8.551; 428/403; 501/127; 501/128
[58] Field of Search ............ 428/402, 403; 501/127, 501/128; 252/855 R

[56] References Cited

U.S. PATENT DOCUMENTS

| | | | |
|---|---|---|---|
| 3,437,148 | 4/1969 | Colpoys, Jr. | 166/308 |
| 3,758,318 | 9/1973 | Farris | 501/128 |
| 3,976,138 | 8/1976 | Colpoys, Jr. et al. | 166/280 |
| 4,303,204 | 12/1981 | Weston | 241/16 |
| 4,427,068 | 1/1984 | Fitzgibbon | 166/280 |
| 4,555,493 | 11/1985 | Watson et al. | 501/127 |
| 4,623,630 | 11/1986 | Fitzgibbon | 501/127 |
| 4,658,899 | 4/1987 | Fitzgibbon | 501/127 |
| 4,668,645 | 5/1987 | Khaund | 501/33 |
| 4,680,230 | 7/1987 | Gibb et al. | 428/403 |

FOREIGN PATENT DOCUMENTS 2921336 12/1979 Fed. Rep. of Germany.

*Primary Examiner*—George F. Lesmes
*Assistant Examiner*—J. Davis
*Attorney, Agent, or Firm*—Pravell, Gambrell, Hewitt, Kimball & Krieger

[57] ABSTRACT

Sintered, spherical composite pellets or particles comprising one or more clays as a major component and bauxite, alumina, or mixtures thereof, are described, along with the process for their manufacture. The pellets may have an alumina-silica ($Al_2O_3$—$SiO_2$) ratio from about 9:1 to about 1:1 by weight. The use of such pellets in hydraulic fracturing of subterranean formations is also described.

14 Claims, No Drawings

SINTERED SPHERICAL PELLETS CONTAINING CLAY AS A MAJOR COMPONENT USEFUL FOR GAS AND OIL WELL PROPPANTS

This is a continuation of application Ser. No. 712,909 filed Mar. 15, 1985, now abandoned, which is a file wrapper continuation application of application Ser. No. 565,429, filed Dec. 27, 1983, abandoned which is a division of application Ser. No. 405,055, filed Aug. 4, 1982, now U.S. Pat. 4,427,068, which is a continuation-in-part of application Ser. No. 347,210, filed Feb. 9, 1982, abandoned, which is a continuation-in-part of application Ser. No. 347,210, filed Feb. 9, 1982 now abandoned.

BACKGROUND OF THE INVENTION

1. Field of the Invention

The present invention relates to oil and gas well proppants and, more particularly, to sintered proppants containing clay as a major component, a method of making such proppants, and to a method of maintaining a fracture in a subterranean formation in a propped condition by utilizing such proppants.

2. History of the Prior Art

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

Spherical particles of uniform size are generally acknowledged to be the most effective proppants due to maxiized permeability. For this reason, assuming other properties to be equal, spherical or essentially spherical proppants, such as rounded sand grains, metallic shot, glass beads and tabular alumina, are preferred.

In practice, in deep wells, where high pressures are encountered, e.g., above about 700 Kg/cm² (10,000 psi), the foregoing specifically mentioned proppants are either entirely ineffective or do not exhibit desired permeability. Examples of prior art proppants and their use are found in U.S. Pat. Nos. 2,950,247, McGuire et al; 3,026,938, Huitt et al; 3,126,056, Harrell; 3,497,008, Graham et al; 3,976,138, Colpoys et al; and 4,068,718, Cooke et al. One of the better proppants useful at high pressures, disclosed in U.S. Pat. No. 3,976,138, is alumina. However, even alumina, as disclosed in U.S. Pat. No. 3,976,138, has reduced permeability at pressures in excess of 350 Kg/cm² (5,000 psi).

As disclosed in U.S. Pat. No. 4,068,718, sintered bauxite unexpectedly has a permeability which is superior to the previously mentioned proppant materials at pressures as high as 700 Kg/cm² (10,000 psi) or higher. Unfortunately, the sintered bauxite material actually used in making the measurements disclosed in U.S. Pat. No. 4,068,718 does not have a desired spherical shape, which would provide high permeability.

The prior art sintered bauxite particles may be produced in spherical shape as described in R. J. Seider's commonly assigned, copending U.S. patent application Ser. No. 252,491, filed Apr. 8, 1981, as a continuation of U.S. patent application Ser. No. 969,122, filed Dec. 13, 1978. However, such proppants, although extremely useful under high pressure conditions, over about 700 Kg/cm² (10,000 psi), are costly. The cost of the prior art sintered bauxite proppant for wells of intermediate pressures, between about 350 and 700 Kg/cm² (5,000 and about 10,000 psi), may not be economically justified. The present invention provides proppants aptly suited to use under pressures of up to about 700 Kg/cm² (10,000 psi), which are more economical and have lower specific gravities and bulk densities, which would benefit the user, in that fewer pounds of proppant per cubic foot of fracture would be required. Handling, e.g., pumping of slurries of lower density material, is also made easier.

BRIEF DESCRIPTION OF THE INVENTION

In accord with the present invention, composite, spherical pellets or particles containing clay as a major component, having an alumina to silica dry weight basis ratio from about 9:1 to about 1:1 and apparent specific gravities less than 3.40, are produced. Diaspore clay, burley clay and flint clay have been found to be useful in the manufacture of such pellets although it is believed that other clays may be employed. Such spherical particles are useful as oil and gas well proppants.

The present calcined clay materials are particularly adapted to use in combination with known, prior art proppant materials, for example, bauxite or alumina, to produce composite sinterable, spherical pellets which are subsequently furnaced to produce sintered, spherical pellets eminently useful as proppants. The composites of the present invention contain a major portion and, more preferably, greater than about 40 percent by weight, of clay. Diaspore clay is preferred and combinations containing up to 95 percent by weight diaspore clay are useful.

The clay materials of the present invention are compatible with, and may be used as a matrix for, a wide variety of proppant materials, and, in this manner, a wide variety of composite proppants may be produced, which may be customized to particular conditions or formations. Thus, the properties of the final sintered composite pellets, such as strength, permeability, specific gravity, bulk density and acid resistance, may be controlled through variations in the initial component mixture.

Combinations of diaspore clay and bauxite are particularly useful. Such mixtures may suitably contain up to 95 percent by weight clay. Mixtures containing up to 80 percent by weight clay have a broad range of use, and mixtures containing 50 to 60 percent by weight clay have a particularly broad range of use.

The present invention also provides a process for propping fractures in oil and gas wells at depths of 7,000 to 14,000 feet utilizing the present sintered pellets by mixing the pellets with a fluid, such as oil or water, and introducing the mixture into a fracture in a subterranean formation. The compaction pressure upon the fracture generally is at least 280 Kg/cm² (4,000 psi) and usually is in the range of from about 350 to about 700 Kg/cm² (5,000 to about 10,000 psi). The present pellets have an average particle size between 0.1 and 2.5 millimeters. It has been found that the present composite pellets containing 50 percent or more parts by weight clay, at pressures up to about 700 Kg/cm² (10,000 psi), have desirable permeability characteristics, i.e., they exhibit a permeability to brine at about 93.3° C. (200° F.) which decreases not more than about three-fourths when the pressure applied to them is increased from 140 to 700 Kg/cm² (2,000 to 10,000 psi).

The present proppant materials are produced by forming a mixture comprised of clay with a material, such as bauxite or alumina. The starting ingredients have an average particle size of less than about 15 microns and, preferably, less than about 10 microns and, most preferably, less than about 5 microns.

In a preferred method, the mixture is produced on an intensive mixer having a rotatable table provided with a rotatable impacting impeller, such as described in U.S. Pat. No. 3,690,622, to Brunner. Sufficient water is added to cause essentially spherical ceramic pellets to form, and, after such pellets have formed, from about 5 to about 15 percent of additional ceramic powder by weight of pellets is added, and the mixer is further operated to cause accretion of the added material to the pellets being formed.

The resulting pellets are then dried at between about 100 and about 300 degrees centigrade and furnaced at sintering temperature until an apparent specific gravity between about 2.70 and about 3.40 is obtained, depending on the composition of the starting mixture.

DETAILED DESCRIPTION OF THE INVENTION

The sintered composite proppant pellets of the present invention have apparent specific gravities less than 3.40 and are spherical in shape.

The sphericity of the pellets may be determined using a visual comparator. Krumbein and Sloss, Stratigraphy and Sedimentation, second edition, 1955, W.H. Freeman & Co., San Francisco, Calif., describe a chart for use in visual determination of sphericity and roundness. Visual comparison using this chart is a widely used method of evaluating sphericity or roundness of particles. In using the visual comparison method, a random sample of 10 to 20 particles of the material to be tested is selected. The particles are viewed under a 10 to 20 power microscope or a photomicrograph and their shapes compared to the Krumbein and Sloss chart. The chart values for sphericity range from 0.3 to 0.9. The chart values for the individual particles are then averaged to obtain a sphericity value. The present particles have an average sphericity of about 0.8 or greater when visually compared with the Krumbein and Sloss chart.

"Spherical" and related forms, as used herein, is intended to mean an average ratio of minimum diameter to maximum diameter of about 0.80 or greater, or having an average sphericity value of about 0.8 or greater compared to a Krumbein and Sloss chart.

"Bulk density", as used herein, is the weight per unit volume, including in the volume considered, the void spaces between the particles.

"Apparent specific gravity" is a number without units, but numerically equal to the weight in grams per cubic centimeter of volume, excluding void space or open porosity in determining the volume. The apparent specific gravity values given herein were determined by liquid (ethylbenzene) displacement.

"Theoretical density" and "true specific gravity" exclude not only the void space between particles and open porosity of particles from the volume, but also exclude closed porosity. These latter two measures are not customarily used for characterizing proppants. Theoretical density and true specific gravity require fine grinding to expose any closed porosity.

Unless otherwise stated at the point of interest, all percentages, proportions and values with respect to composition are expressed in terms of weight.

The sintered, spherical pellets of the present invention may be manufactured by furnacing a composite clay mixture. Various sintering aids may be incorporated with the starting mixture, for example, minor amounts of bentonite clay or iron oxide, boron, boron carbide, aluminum diboride, boron nitride, boron phosphide and other boron compounds. If sintering aids are used, generally up to about 30 weight percent are found useful. The most desirable range of sintering aid can be readily determined by those skilled in the art, depending upon the particular clay mixture used. Fluxes, such as sodium carbonate, lithium carbonate, feldspar, manganese oxide, titania, iron oxide and sodium silicates, up to about 30 weight percent, may be added to aid sintering. If desired, a binder, for example, various resins or waxes known in the prior art, may be added to the initial mixture to improve pelletizing and to increase the green strength of the unsintered pellets.

Pellets according to the present invention and for use with the present invention may be prepared from a mixture of any of the clays described in Table I with bauxite or alumina or mixtures of these. The composition of the specific bauxite employed in the manufacture of the pellets described herein is also given in Table I. All values in Table I are expressed as percentages by weight. Where an omission occurs, it indicates that sufficient testing was not conducted to obtain a value.

TABLE I

| Chemical Compound | (Typical Analysis of Bauxite and Clays - calcined) | | | | | |
|---|---|---|---|---|---|---|
| | Surinam Bauxite | High Purity Diaspore Clay | High Silica Diaspore Clay | High Iron (Brown) Diaspore Clay | Burley Clay | Flint Clay |
| $Al_2O_3$ | 86.80 | 75.10 | 70.00 | 78.30 | 54.07 | 38.52 |
| $SiO_2$ | 3.42 | 18.60 | 24.40 | 15.09 | 41.33 | 56.64 |
| $Fe_2O_3$ | 4.74 | 0.80 | .80 | 2.63 | 1.26 | 0.65 |
| $TiO_2$ | 3.13 | 2.99 | 3.04 | 3.05 | 2.45 | 3.49 |
| Other (e.g. MgO, CaO) | 1.00 | 1.51 | — | 0.72 | 0.74 | 0.67 |
| Loss on Ignition | 0.91 | 1.00 | — | 0.21 | 0.15 | 0.03 |

TABLE I-continued
(Typical Analysis of Bauxite and Clays - calcined)

| Chemical Compound | Surinam Bauxite | High Purity Diaspore Clay | High Silica Diaspore Clay | High Iron (Brown) Diaspore Clay | Burley Clay | Flint Clay |
|---|---|---|---|---|---|---|
| Apparent Specific Gravity After Calcining g/cc | 3.6–3.7 | 2.9–3.1 | 2.9–3 | 2.9–3.1 | 2.7–2.8 | 2.5–2.6 |

Each of the clays described in Table I may be obtained from Missouri Minerals Processing, High Hill, Mo. 63350, in calcined form.

The Surinam bauxite described in Table I may be obtained from Aluminum Company of America, Pittsburgh, Pa. 15219. Surinam bauxite is so designated for that is the country in which it is mined. It is expected that other bauxites may be substituted without departing from the present invention.

Disaspore clays, as found in nature, are predominantly hydrated aluminum oxide ($Al_2O_3 \cdot H_2O$). Such clays occur in emery rock in association with corundum. The main deposits of diaspore clays in the United States are in Missouri and Pennsylvania. Diaspore clays have a hardness between 6.5 and 7.0 and a true specific gravity usually between 3.30 and 3.45 gm/cm$_3$. The crystal structure of diaspore clay is orthorhombic. Typically, diaspore clay, as found in nature, contains 25 to 30 percent by weight, and, in some cases, as high as 35 percent by weight, of impurities. Generally, the major impurities are: $SiO_2$, which typically ranges from about 12 to about 25 percent by weight; $TiO_2$, which typically ranges from about 2.75 to 3.75 percent; $Fe_2O_3$, typically between 0.25 and 1.0 percent; and MgO and CaO, generally less than 1.0 percent.

The clay materials for use in the present invention are initially calcined, by known prior art methods, at temperatures and times sufficiently high to remove any organic material and to substantially remove water of hydration.

The sintered, spherical pellets of the present invention are preferably made as follows:

1. Starting ingredients of calcined clay and alumina, bauxite, or mixtures thereof, are added in a predetermined ratio to a high intensity mixer. At least 40 percent of the total ingredients on a dry weight basis is clay. Each of the ceramic ingredients has an average particle size of less than about 15 microns and preferably less than about 10 microns and most preferably, less than about 5 microns.

The small particle size is required in order to obtain a finished spherical sintered pellet having the desired density. An average particle size of smaller than 5 microns is desirable, and the average particle size is most preferably below 3 microns and usually above 0.5 microns.

2. The powdered ceramic starting ingredients are stirred to form a dry homogeneous particulate mixture having an average particle size of less than about 15 microns.

A preferred stirring or mixing device is that obtainable from Eirich Machines, Inc., known as the Eirich Mixer. A mixer of this type is provided with a horizontal or inclined circular table, which can be made to rotate at a speed of from about 10 to about 60 revolutions per minute (rpm), and is provided with a rotatable impacting impeller, which can be made to rotate at a tip speed of from about 5 to about 50 meters per second. The direction of rotation of the table is opposite that of the impeller, causing material added to the mixer to flow over itself in countercurrent manner. The central axis of the impacting impeller is generally located within the mixer at a position off center from the central axis of the rotatable table. The table may be in a horizontal or inclined position, wherein the incline, if any, is between 0 and 35 degrees from the horizontal.

3. While the mixture is being stirred, there is added sufficient water to cause formation of composite, spherical pellets from the ceramic powder mixture.

In general, the total quantity of water which is sufficient to cause essentially spherical pellets to form is from about 17 to about 20 percent by weight of the initial starting ceramic ingredients and usually between about 18 and about 20 percent by weight of the initial ceramic powder. The total mixing time usually is from about 2 to about 6 minutes.

After the clay mixture is added to the mixer, the table is rotated at from about 10 to about 60 rpm and, preferably, from about 20 to about 40 rpm, and the impacting impeller is rotated to obtain a tip speed of from about 25 to about 50, preferably, from about 25 to about 35, meters per second, and sufficient water is added to cause essentially spherical pellets of the desired size to form. If desired, the impeller may be initially rotated at from about 5 to about 20 meters per second during addition of one-half of the sufficient water and subsequently rotated at the higher tip speed of 25 to about 50 meters per second during the addition of the balance of the water. The rate of water addition is not critical. The intense mixing action quickly disperses the water throughout the particles.

4. The resulting pellets are dried at a temperature of between about 100° (212° F.) and about 300° C. (572° F.) until preferably less than 3 percent and, most preferably, less than 1 percent moisture remains in the pellets. The most preferred drying temperature is between about 175° (347° F.) and 275° C. (527° F.), and the drying time is usually between about 30 and about 60 minutes.

5. The dried pellets are then furnaced at sintering temperature for a period sufficient to enable recovery of sintered, spherical pellets having an apparent specific gravity of between 2.70 and 3.40 and a bulk density of from about 1.35 to about 1.80 grams per cubic centimeter. The specific time and temperature to be employed is, of course, dependent on the starting ingredients and is determined empirically according to the results of physical testing of pellets after furnacing. The furnacing step is carried out to sinter the composite pellets; generally, temperatures of between about 1,350° C. (2,462° F.) and about 1,550° C. (2,822° F.) for about 4 to about 20 minutes and, more preferably, from about 1,485° (2,705° F.) to about 1,515° C. (2,759° F.) for about 4 to about 8 minutes, are useful, depending upon the sintering aids and fluxes which may be included.

While the process just described hereinabove will yield pellets according to the invention, it is preferred that from about 5 to about 15 percent and, preferably, from about 8 to about 10 percent of additional starting ingredients by weight of pellets be added, after the addition of water but prior to drying of the pellets. The added material is of the same composition as that described in step 1. The addition of more dry ceramic powder is followed by rotating the impeller at a tip speed of between about 5 and about 20 meters per second, preferably, between about 10 and about 20 meters per second, for from about 1 to about 6 minutes, while continuing to rotate the table at from about 10 to about 60 rpm and, preferably, from about 20 to about 40 rpm. This step improves yield and results in improved sphericity of the pellets.

If desired, the rotation of the impeller may then be stopped while the table continues to rotate for between about 1 and about 5 minutes.

The impacting impeller is preferably a disk provided with peripheral rods or bars attached to the disk. The longitudinal axis of the rods or bars is desirably essentially parallel with the axis of rotation of the impeller, which is usually a vertical axis. The diameter of the impeller is measured from the axis of rotation to the center of the most distant rod or bar. Tip speed is the speed of the most distant rod or bar.

The diameter of the impeller depends upon the size of the mixer but is usually less than 25 percent of the diameter of the mixer. The impeller in most applications is between 10 and 100 centimeters in diameter and usually rotates at from 200 to 3,750 rpm at the lower tip speeds of 10 to 20 meters per second, depending upon impeller diameter, and at from 500 to 6,500 rpm at the higher tip speeds of 25 to 35 meters per second, depending upon impeller diameter.

The pellets are screened for size preferably after drying. However, they may be screened before drying or after furnacing. The rejected oversized and undersized pellets and powdered material obtained after the drying and screening steps may be recycled. The finished pellets may be tumbled to enhance smoothness. The resultant sintered pellets have a bulk density ranging from about 1.35 to about 1.85 grams per cubic centimeter, depending upon the ceramic starting ingredients employed.

The overall particle size of the pellets for use as propping agent for increasing permeability in a subterranean formation penetrated by well is between 0.1 and about 2.5 millimeters and preferably between about 0.15 and 1.7 millimeters.

In Table II is summarized the composition for several pellets according to the invention produced from the raw material indicated. Also given are the results of testing of these pellets. Unless otherwise indicated, parts and percentages are by weight. All samples were prepared in accord with the procedures given herein. Example 1 gives in detail the procedure employed in the preparation of Sample No. 2, which procedure is typical of that employed in preparation of the remainder of the samples reported in Table II.

TABLE II

| INGREDIENTS | | | 1 50% DIASPORE CLAY 50% SURINAM BAUXITE | 2 60% DIASPORE CLAY 40% BAUXITE | 70% DIASPORE CLAY 30% BAUXITE | 4 80% DIASPORE CLAY 20% BAUXITE | 5 90% DIASPORE CLAY 10% BAUXITE |
|---|---|---|---|---|---|---|---|
| Composition of furnaced pellets | | | | | | | |
| $Al_2O_3$ | | | 82.10 | 79.78 | 78.61 | 77.44 | 76.27 |
| $SiO_2$ | | | 9.31 | 12.52 | 14.04 | 15.56 | 17.08 |
| $Al_2O_3$—$SiO_2$ ratio (based on % by wgt.) | | | 8.82 | 6.37 | 5.60 | 4.98 | 4.46 |
| $Fe_2O_3$ | | | 3.14 | 2.36 | 1.97 | 1.58 | 1.19 |
| $TiO_2$ | | | 3.06 | 3.04 | 2.88 | 3.02 | 3.01 |
| Other | | | 2.39 | 2.30 | 2.50 | 2.40 | 2.45 |
| Roundness | | | — | .86 | — | .78 | — |
| Sphericity | | | — | .85 | — | .75 | — |
| Acid Solubility (12% Hydrochloric, 3% Hydrofluoric) | | | — | 5.42 | 4.86 | 5.73 | — |
| Bulk Density | | | | | | | |
| grams/cubic centimeter | | | — | 1.79 | 1.70 | 1.63 | 1.53 |
| pounds/cubic foot | | | — | 112 | 106 | 102 | 96 |
| Apparent Specific Gravity | | | | | | | |
| grams/cubic centimeter | | | — | 3.27 | 3.20 | 3.10 | 3.07 |
| API Crush (% fines) | | | | | | | |
| 7500 psi | | | — | — | — | 7.24 | — |
| 10000 psi | | | — | 9.9 | 5.88 | 11.61 | 12.27 |
| | Applied Pressure | | | | | | |
| | psi | Kg/cm² | | | | | |
| Permeability, Darcies at .125" fracture width | 2000 | 140 | — | 225 | 195 | 156 | 162 |
| | 4000 | 281 | — | 193 | 180 | 139 | 134 |
| | 6000 | 422 | — | 163 | 151 | 113 | 108 |
| | 8000 | 562 | — | 138 | 122 | 85 | 84 |
| | 10000 | 703 | — | 113 | 95 | 69 | 61 |

TABLE II-continued

| | | | | | | |
|---|---|---|---|---|---|---|
| | 12000 | 844 | — | 88 | 73 | 44 | 41 |
| | 14000 | 984 | — | 64 | 55 | 32 | 21 |
| % decrease in permeability 2000-10,000 psi | | | — | 50 | 51 | 56 | 62 |

| | SAMPLE NO. | | | | |
|---|---|---|---|---|---|
| | 6 | 7 | 8 | 9 | 10 |
| INGREDIENTS | 95% DIASPORE CLAY 05% BAUXITE | 70% BURLEY CLAY 30% BAUXITE | 50% FLINT CLAY 50% BAUXITE | 65% FLINT CLAY 35% BAUXITE | 75% FLINT CLAY 25% BAUXITE |
| Composition of furnaced pellets | | | | | |
| $Al_2O_3$ | 75.68 | 63.91 | 62.65 | 55.41 | 50.58 |
| $SiO_2$ | 17.84 | 29.93 | 30.00 | 37.98 | 43.30 |
| $Al_2O_3$—$SiO_2$ ratio (based on % by wgt.) | 4.24 | 2.14 | 2.09 | 1.46 | 1.17 |
| $Fe_2O_3$ | 1.00 | 2.32 | 2.70 | 2.11 | 1.71 |
| $TiO_2$ | 3.01 | 2.68 | 3.30 | 3.37 | 3.41 |
| Other | 17.53 | 1.16 | 1.35 | 1.13 | 1.00 |
| Roundness | .80 | .84 | .81 | .81 | .84 |
| Sphericity | .82 | .82 | .82 | .80 | .81 |
| Acid Solubility (12% Hydrochloric, 3% Hydrofluoric) | 6.28 | 7.40 | 4.96 | 4.83 | 4.60 |
| Bulk Density | | | | | |
| grams/cubic centimeter | 1.51 | 1.47 | 1.53 | 1.43 | 1.40 |
| pounds/cubic foot | 95 | 92 | 95.5 | 89 | 88 |
| Apparent Specific Gravity | | | | | |
| grams/cubic centimeter | 3.05 | 2.86 | 2.83 | 2.79 | 2.75 |
| API Crush (% fines) | | | | | |
| 7500 psi | — | — | — | 3.55 | 8.51 |
| 10000 psi | — | 17.48 | 11.30 | — | — |

| Applied Pressure | | | | | | |
|---|---|---|---|---|---|---|
| psi | Kg/cm² | | | | | |
| Permeability, Darcies at .125" fracture width | | | | | | |
| 2000 | 140 | 109 | 198 | 250 | 185 | 225 |
| 4000 | 281 | 98 | 180 | 222 | 172 | 210 |
| 6000 | 422 | 84 | 137 | 169 | 134 | 173 |
| 8000 | 562 | 65 | 91 | 116 | 90 | 112 |
| 10000 | 703 | 37 | 56 | 74 | 55 | 64 |
| 12000 | 844 | 20 | 32 | 46 | 32 | 35 |
| 14000 | 984 | 11 | 18 | 27 | 16 | 17 |
| % decrease in permeability 2000-10,000 psi | | 66 | 72 | 70 | 70 | 72 |

— = not tested

The test procedures and apparatus employed to test the permeability in darcies of the pellets of the present invention included placing a predetermined quantity of the material to be tested between two parallel hardened steel plates, applying force tending to close the initially established 0.125 inch gap between the plates, then measuring the flow rate through the packed cell using brine (2 percent KCl) at 93.3° C. (200° F.) at various applied stresses or pressures. The particle size distribution of the pellets was 20×40 mesh, U.S. Standard Sieves (ninety percent by weight minimum of pellets will pass through 20 mesh [841 micron] screen but not through 40 mesh [420 micron] screen).

Values obtained using the American Petroleum Institute (API) procedure for determining resistance to crushing are also reported in Table II. According to this procedure, a bed of about 6 mm depth of sample to be tested is placed in a hollow cylindrical cell. A piston is inserted in the cell. Thereafter, a load is applied to the sample via the piston. One minute is taken to reach maximum load which is then held for two minutes. The load is thereafter removed, the sample removed from the cell, and screened to separate crushed material. The results are reported as a percentage by weight of the original sample.

Acid solubility of the samples reported in Table II was tested in accordance with recommended API test procedure, fourth draft, June 1980. In this procedure a known weight of sample (5 g) is placed in a 150 ml polyethylene beaker containing 100 ml of 12%-3% Hcl-HF acid. The sample acid containing beaker is then placed in a 65.6° C. (150° F.) water bath for 30 to 35 minutes. The sample is not stirred. The sample is thereafter filtered through a previously weighed filter crucible or funnel and washed three times with 20 ml portions of distilled water. The filtered and washed sample is thereafter dried to constant weight (approximately one hour) at 105° C. (220° F.). The values given in Table II represent the percentage of weight lost or dissolved due to the acid.

Sphericity of the pellets reported in Table II was determined using a Krumbein and Sloss chart. The values reported represent an average of 10-20 pellets per sample.

Roundness as reported in Table II is a measure of the relative sharpness of the pellet corners, or of curvature. This evaluation may be done at the same time and on the same sample as that used for sphericity. The pellets are visually compared with a Krumbein and Sloss chart. The values reported represent an average of 10–20 pellets per sample.

Bulk density values reported in Table II were determined by weighing that amount of sample that would fill a cup of known volume.

EXAMPLE 1

About 81 kilograms of diaspore clay material that had been previously calcined at a temperature sufficiently high to remove any organic materials and substantially all of the water of hydration from the clay, together with about 54 kilograms of bauxite (60% by weight clay) powder having an average particle size of between 4 and 8 microns were added to an Eirich mixer having a table diameter of about 115 centimeters, an operating capacity of about 160 kilograms and an impacting impeller diameter of about 27 centimeters.

The table was rotated at about 35 rpm, and the impeller was rotated at about 1,090 rpm, and about 27 kilograms of water was added. Rotation of the table and impeller was continued for about 1 minute; subsequently, the impeller speed was increased to about 2,175 rpm. The table and impeller were rotated until seed pellets were formed, less than 5 percent of which were of a size smaller than 0.50 mm (about 3 minutes). The impeller was then reduced to about 1,090 rpm, and about 4.08 kilograms of the initial diaspore clay - bauxite powder mixture was added. Rotation of the pan and impeller was then continued for an additional 2 minutes to form spherical pellets.

The pellets were then dried for about 20 minutes at about 110° C. (230° F.) in a rotary dryer and then fired at about 1,500° C. (2,732° F.) for about 5 minutes. The yield of useful pellets having a size between 150 and 1,700 microns (0.15 and 1.7 millimeters) was greater than 90 percent by weight of starting ceramic powder. The resulting pellets had an apparent specific gravity of about 3.25, a bulk density of 1.79 gm/cm$_3$ and a sphericity of greater than 0.8, as determined using the Krumbein and Sloss chart.

The permeability in darcies of the pellets like Sample 2 was determined in 2% KCl solution at 93.3° C. (200° F.) at various applied pressures. The results are shown in Table III.

TABLE III

| 60% Diaspore Clay/40% Bauxite | | |
|---|---|---|
| Applied Pressure | | |
| (Kg/cm$^3$) | (psi) | Permeability (Darcies) |
| 122.5 | 1742 | 233 |
| 245.0 | 3485 | 199 |
| 367.5 | 5227 | 176 |
| 490.0 | 6969 | 150 |
| 612.5 | 8712 | 128 |
| 735.0 | 10454 | 102 |

The crush strength of the pellets like Sample 2 was tested by measuring the compressibility of the pellets by placing a bed of about 6 millimeters of furnaced pellets in a cylinder and applying pressure by means of a piston. The amount of pressure required to induce various fixed amounts of compaction was measured. The results are shown in Table IV.

TABLE IV

| 60% Diaspore Clay/40% Bauxite | | |
|---|---|---|
| Compaction Induced | Pressure Required Kg/cm$^2$ | psi |
| 0.254 mm (0.010 inch) | 119 | 1693 |
| 0.508 mm (0.020 inch) | 238 | 3385 |
| 0.762 mm (0.030 inch) | 399 | 5675 |
| 1.016 mm (0.040 inch) | 581 | 8264 |
| 1.270 mm (0.050 inch) | 749 | 10,653 |
| 1.524 mm (0.060 inch) | 959 | 13,640 |
| 1.778 mm (0.070 inch) | 1,155 | 16,428 |

The composite, spherical, sintered pellets of the present invention are useful as a propping agent in methods of fracturing subterranean formations to increase the permeability thereof, particularly those formations having a compaction pressure of at least 280 Kg/cm$^2$ (4000 psi), which are typically located at a depth 6,000 feet or greater. Pellets according to the present invention are presently believed to be particularly suitable for use at depths greater than 7,000 feet but less than 14,000 feet.

When used as a propping agent, the pellets of the present invention may be handled in the same manner as other propping agents. The pellets may be delivered to the well site in bags or in bulk form along with the other materials used in fracturing treatment. Conventional equipment and techniques may be used to place the spherical pellets as propping agent.

A viscous fluid, frequently referred to as "pad", is injected into the well at a rate and pressure to initiate and propagate a fracture in the subterranean formation. The fracturing fluid may be an oil base, water base, acid, emulsion, foam, or any other fluid. Injection of the fracturing fluid is continued until a fracture of sufficient geometry is obtained to permit placement of the propping pellets. Thereafter, pellets as hereinbefore described are placed in the fracture by injecting into the fracture a fluid into which the pellets have previously been introduced and suspended. The propping distribution is usually, but not necessarily, a multi-layer pack. The overall particle size of the pellets is between about 0.1 and about 2.5 millimeters and, more preferably, between about 0.15 and about 1.7 millimeters. Following placement of the pellets, the well is shut-in for a time sufficient to permit the pressure in the fracture to bleed off into the formation. This causes the fracture to close and apply pressure on the propping pellets which resist further closure of the fracture.

The foregoing description and embodiments are intended to illustrate the invention without limiting it thereby. It will be understood that various modifications can be made in the invention without departing from the spirit or scope thereof.

I claim:

1. A gas and oil well proppant comprising a plurality of composite, sintered, spherical pellets having a permeability to brine at about 200° F. (93.3° C.) which deceases not more than about three-fourths when the applied pressure on said pellets is increased from 2,000 to 10,000 psi (140 to 700 kg/cm$^2$), said pellets being prepared from a mixture of calcined clay and calcined bauxite, said mixture containing at least 40 percent clay on a dry weight basis, and said pellets having an alumina to silica ratio on a dry weight basis from about 9:1 to 1.17:1, more than 6.12 weight percent of other than alumina and silica, a diameter of between 0.1 and about 2.5 millimeters, an apparent specific gravity of less than 3.40 but greater than 2.75 g/cc and a bulk density greater than 88 lbs./cubic ft.

2. The proppant of claim 1, wherein the pellets have an alumina to silica dry weight basis ratio from about 4:1 to about 6.5:1.

3. The proppant of claim 2, wherein the pellets have an alumina to silica ratio of about 5:1.

4. The proppant of claim 1, wherein said pellets have an apparent specific gravity from about 3.0 to about 3.3 and an alumina to silica ratio on a dry weight basis from about 4:1 to about 6.5:1.

5. The proppant of claim 1, wherein said pellets have at least 90 percent by weight of $Al_2O_3$ and $SiO_2$.

6. The proppant of claim 5, wherein the clay is diaspore, flint or burley.

7. The proppant of claim 1, wherein the pellets have not more than about 82 percent by weight of $Al_2O_3$.

8. The proppant of claim 1, wherein the pellets are prepared from at least 40 percent by weight of diaspore clay.

9. The proppant of claim 8, wherein said pellets are prepared from at least 60 percent by weight of diaspore clay.

10. The proppant of claim 1, wherein the pellets are prepared from disapore clay and bauxite.

11. The proppant of claim 10 wherein the pellets are prepared from at least 60 percent by weight of disapore clay.

12. The proppant of claim 1, wherein the pellets are prepared from about 80 percent by weight of disapore clay and about 20 percent by weight of Surinam bauxite.

13. The proppant of claim 1, wherein the pellets are prepared from about 70 percent by weight of burley clay and about 30 percent by weight of bauxite, said pellets having an apparent specific gravity of about 2.86.

14. The proppant of claim 1, wherein the pellets are prepared from about 50 to about 75 percent by weight of flint clay and from about 50 to about 25 percent by weight of bauxite.

* * * * *

UNITED STATES PATENT AND TRADEMARK OFFICE
CERTIFICATE OF CORRECTION

PATENT NO. : 4,879,181

DATED : November 7, 1989

INVENTOR(S) : Jeremiah J. Fitzgibbon

It is certified that error appears in the above-identified patent and that said Letters Patent is hereby corrected as shown below:

At column 1, lines 11-13 delete "which is a continuation-in-part of application Ser. No. 347,210, filed Feb. 9, 1982, abandoned,".

At column 1, line 48, change "maxiized" to --maximized--.

At column 5, line 24, change "($Al_2O_3.H_2O$)" to --($Al_2O_3 \cdot H_2O$)--.

At column 5, line 29, change "gm/cm3" to --$gm/cm^3$--.

At column 8, top of third column in Table II, insert --3--.

At column 11, line 42, change "gm/cm3" to --$gm/cm^3$--.

At column 12, line 58, change "deceases" to --decreases--.

Signed and Sealed this

Twenty-first Day of April, 1992

Attest:

HARRY F. MANBECK, JR.

*Attesting Officer*      *Commissioner of Patents and Trademarks*

REEXAMINATION CERTIFICATE (2184th)
United States Patent [19]
Fitzgibbon

[11] B1 4,879,181

[45] Certificate Issued Jan. 11, 1994

[54] SINTERED SPHERICAL PELLETS CONTAINING CLAY AS A MAJOR COMPONENT USEFUL FOR GAS AND OIL WELL PROPPANTS

[75] Inventor: Jeremiah J. Fitzgibbon, Lafayette, La.

[73] Assignee: Carbo Ceramics Inc., Irving, Tex.

Reexamination Request:
No. 90/002,072, Jun. 29, 1990

Reexamination Certificate for:
Patent No.: 4,879,181
Issued: Nov. 7, 1989
Appl. No.: 40,534
Filed: Apr. 20, 1987

Certificate of Correction issued Apr. 21, 1992.

Related U.S. Application Data

[60] Continuation of Ser. No. 712,909, Mar. 15, 1985, abandoned, and a continuation-in-part of Ser. No. 347,210, Feb. 9, 1982, abandoned, which is a continuation of Ser. No. 565,429, Dec. 27, 1983, abandoned, which is a division of Ser. No. 405,055, Aug. 4, 1982, Pat. No. 4,427,068, which is a continuation-in-part of Ser. No. 347,210, Feb. 9, 1982, abandoned.

[51] Int. Cl.$^5$ .................... B32B 18/00; C09K 7/00
[52] U.S. Cl. .................. 428/402; 252/8.551; 428/403; 501/127; 501/128
[58] Field of Search ............... 428/402; 501/127, 128; 252/8.551

[56] References Cited

U.S. PATENT DOCUMENTS

3,976,138  8/1976  Colpoys, Jr. et al. .

OTHER PUBLICATIONS

Oxide Ceramic Proppants for Treatment of Deep Well Fractures, SPE 6816, by E. A. Neel, J. L. Parmley, and P. J. Colpoys, Jr. (1977).
UCAR Ceramic Props, The Ideal Proppant for Deep Wells and High Compaction Pressures.

*Primary Examiner*—Jenna Davis

[57] ABSTRACT

Sintered, spherical composite pellets or particles comprising one or more clays as a major component and bauxite, alumina, or mixtures thereof, are described, along with the process for their manufacture. The pellets may have an alumina-silica ($Al_2O_3$—$SiO_2$) ratio from about 9:1 to about 1:1 by weight. The use of such pellets in hydraulic fracturing of subterranean formations is also described.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 14 is confirmed.

* * * * *